(12) United States Patent
Brombal

(10) Patent No.: US 9,992,709 B2
(45) Date of Patent: Jun. 5, 2018

(54) DYNAMIC SESSION TRANSFER NUMBER FOR VOICE CALL CONTINUITY

(71) Applicant: TELEFONAKTIEBOLAGET L M ERICSSON (PUBL), Stockholm (SE)

(72) Inventor: David Brombal, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 644 days.

(21) Appl. No.: 14/549,619

(22) Filed: Nov. 21, 2014

(65) Prior Publication Data

US 2015/0156680 A1    Jun. 4, 2015

Related U.S. Application Data

(60) Provisional application No. 61/911,126, filed on Dec. 3, 2013, provisional application No. 61/911,177, filed on Dec. 3, 2013.

(51) Int. Cl.
*H04L 12/66* (2006.01)
*H04W 36/00* (2009.01)
(Continued)

(52) U.S. Cl.
CPC ..... *H04W 36/0022* (2013.01); *H04L 65/1083* (2013.01); *H04L 65/80* (2013.01);
(Continued)

(58) Field of Classification Search
CPC .......... H04L 2012/5608; H04W 84/12; H04W 88/08; H04W 80/04; H04W 88/06; H04W 84/18; H04W 74/08
(Continued)

(56) References Cited

U.S. PATENT DOCUMENTS 9,467,906 B2 * 10/2016 Wong ................... H04W 4/22
2008/0080480 A1 * 4/2008 Buckley ................ H04L 12/66
370/352
(Continued)

OTHER PUBLICATIONS

Voice Call Continuity between IMS and Circuit Switched Systems. 3GPP2 Draft; X.P0042-B, 3rd Generation Partnership Project 2, 3GPP2, 2500 Wilson Boulevard, Suite 300, Arlington, Virginia 22201; USA vol. TSGSX, No. v1.0. Jun. 5, 2013 (Jun. 5, 2013), pp. 1-114.
(Continued)

*Primary Examiner* — Brenda H Pham

(57) ABSTRACT

A method in a network node for voice call continuity is disclosed. The network node receives, from a second network node with which a wireless device having a first session transfer number has registered, a registration notification message including a second session transfer number dynamically assigned to the wireless device by the second network node for voice call continuity. The network node stores the dynamically assigned second session transfer number. The network node receives a network query message sent in response to a mobile switching center receiving a call origination message from the wireless device, the call origination message including the first session transfer number as a destination. The network node determines that there is an active call involving the wireless device, and sends a network query response message to the mobile switching center that includes the dynamically assigned second session transfer number.

4 Claims, 14 Drawing Sheets

(51) Int. Cl.
  *H04L 29/06* (2006.01)
  *H04W 8/06* (2009.01)
  *H04W 8/12* (2009.01)
  *H04W 60/00* (2009.01)

(52) U.S. Cl.
  CPC ......... *H04W 8/06* (2013.01); *H04W 36/0066* (2013.01); *H04W 8/12* (2013.01); *H04W 60/005* (2013.01)

(58) Field of Classification Search
  USPC ...................... 370/349, 310.2, 328, 338, 331
  See application file for complete search history.

(56) References Cited

U.S. PATENT DOCUMENTS

| | | | |
|---|---|---|---|
| 2009/0034472 A1* | 2/2009 | Purnadi | H04W 36/0027 370/331 |
| 2010/0124897 A1 | 5/2010 | Edge | |
| 2013/0029629 A1* | 1/2013 | Lindholm | H04W 36/0022 455/404.1 |

OTHER PUBLICATIONS

3rd Generation Partnership Project; Technical Specification Group Services and System Aspects; Single Radio Voice Call Continuity (SRVCC) enhancements; Stage 2 (Release 10). 3GPP Standard; 3GPP TR 23.856, 3$^{rd}$ Generation Partnership Project (3GPP), Mobile Competence Centre ; 650, Route des Lucioles ; F-06921 Sophia-Antipolis Cedex; France, No. v10.0.0, Sep. 19, 2010 (Sep. 19, 2010), pp. 1-80.

3rd Generation Partnership Project; Technical Specification Group Core Network and Terminals; IP Multimedia (IM) Core Network (CN) subsystem IP Multimedia Subsystem (IMS) Service Continuity; Stage 3 (Release 10). 3GPP Standard; 3GPP TS 24.237 v10.3.0. 3$^{rd}$ Generation Partnership Project (3GPP), Mobile Competence Centre; 650, Route des Lucioles ; F-06921 Sophia-Antipolis Cedex; France, vol. CT WG1, No. v10.3.0, Jun. 14, 2011 (Jun. 14, 2011), pp. 1-205.

3rd Generation Partnership Project; Technical Specification Group Services and System Aspects; Single Radio Voice Call Continuity (SRVCC); Stage 2 (Release 11). 3GPP Standard; 3GPP TS 23.216 v11.9.0. 3$^{rd}$ Generation Partnership Project (3GPP), Mobile Competence Centre; 650, Route des Lucioles; F-06921 Sophia-Antipolis Cedex; France. vol. SA WG2, No. v11.9.0, Jun. 22, 2013 (Jun. 22, 2013), pp. 1-68.

\* cited by examiner

```
SIP/2.0 200 OK
Feature-Caps: *;+g.3gpp.atcf="<tel:+1-237-888-9999>"
Path: <sip:termsdgidfws@atcf.visited2.net>,<sip:agaagfgf@pcscf1.visited2.net:5070;ob>
Service-Route: <sip:orig@scscf1.home1.net;lr>
P-Charging-Vector:
Via: SIP/2.0/UDP atcf.visited2.net:5060;branch=z9hG4bKnas5999; SIP/2.0/UDP
    pcscf1.visited2.net:5060;branch=z9hG4bKnas56565, SIP/2.0/UDP
    [5555::aaa:bbb:ccc:eee];comp=sigcomp;branch=z9hG4bKnasinen8;rport=5060;received=5555::aaa:bbb:cc
    c:eee
Max-Forwards: 66
From:
To:
Contact:
Call-ID:
Authorization:
CSeq:
Supported:
Content-Length:
```

Fig. 5

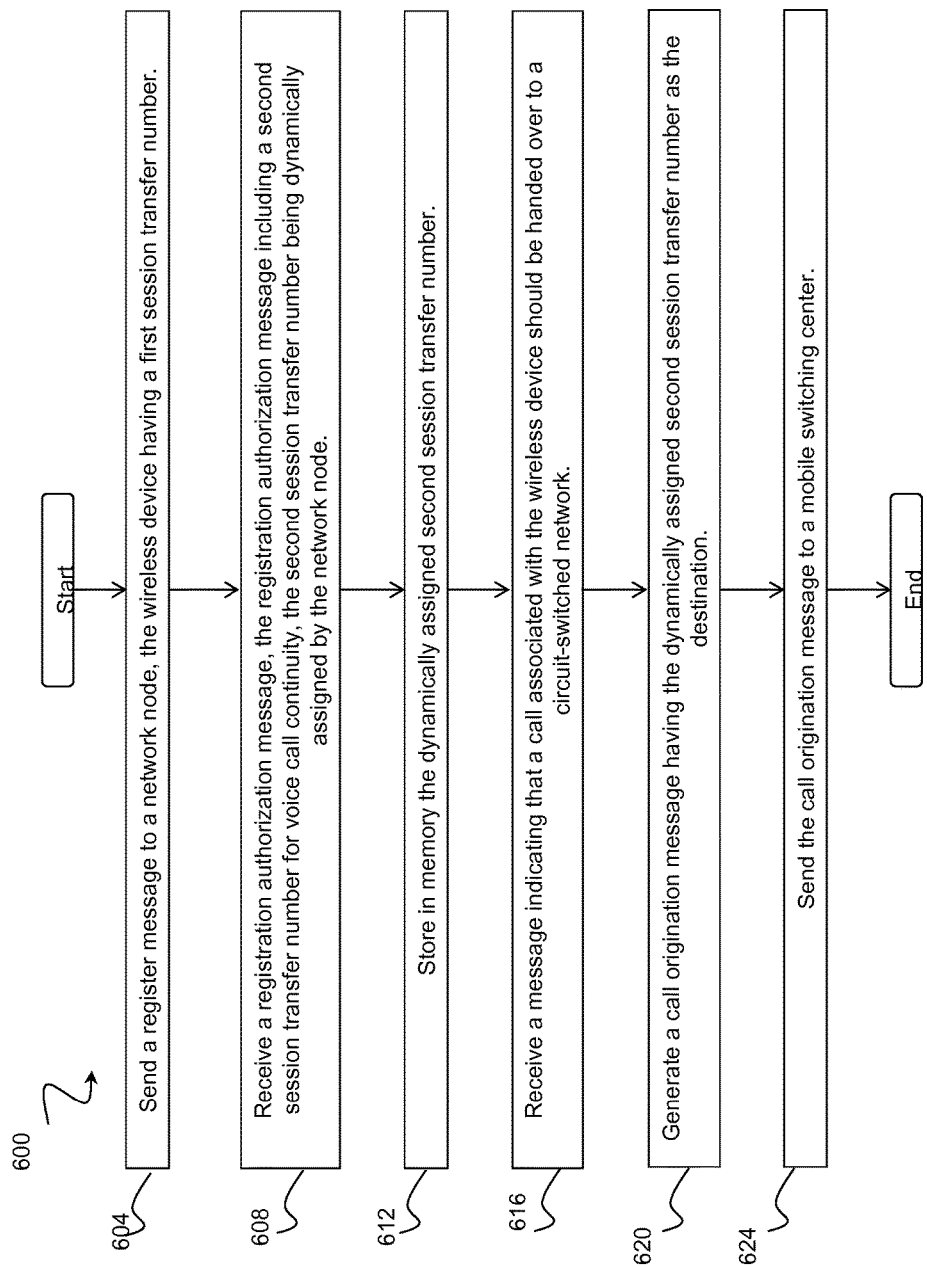

DYNAMIC SESSION TRANSFER NUMBER FOR VOICE CALL CONTINUITY

PRIORITY

This application claims the benefit under 35 U.S.C. § 119(e) of the priority of the following U.S. Provisional Applications filed on Dec. 3, 2013, the entire disclosures of which are hereby incorporated by reference: U.S. Provisional Application 61/911,126, entitled "DYNAMIC STN-SR USED BY SCC-AS FOR 3GPP2 VOICE CALL CONTINUITY (VCC);" and U.S. Provisional Application 61/911,177, entitled "DYNAMIC STN-SR USED BY UE FOR 3GPP2 VOICE CALL CONTINUITY (VCC)."

TECHNICAL FIELD

Particular embodiments relate, in general, to wireless communications and, more particularly, to methods and systems for voice call continuity.

BACKGROUND

In a wireless network, procedures may exist to provide for voice call continuity. As one example, both 3GPP and 3GPP2 define procedures for a process called Single Radio Voice Call Continuity (SRVCC). This process is generally applicable to calls in a packet-switched network, such as Voice over LTE (VoLTE) calls. For example, SRVCC may apply to VoLTE calls in which the LTE signal is no longer useable (for example, if the LTE signal becomes too weak), but where a useable signal is still available for a traditional circuit-switched network, such as CDMA. Situations like these may occur in the early days of VoLTE service rollout, when LTE coverage may not be as complete as the legacy circuit-switched network, and users may move from areas of good LTE coverage to areas of poor, or no, coverage while engaged in a phone call.

In order to avoid a dropped call, the SRVCC process is meant to hand the voice path over from the packet-switched network to the circuit-switched network while the call is in progress. Since this involves the handset re-tuning its single radio from one network technology to a different one, it results in a temporary interruption in the voice path. Minimizing this interruption is desirable, not only for the success of the handover process, but also to user satisfaction with the voice call continuity (VCC) service. In existing solutions, the processes used to handover the call may be inefficient.

One existing solution for handing over a call from a packet-switched network (such as, for example, an LTE network) to a circuit-switched network (such as, for example, a CDMA network) involves the use of a provisioned number in a wireless device. For example, the number may be a Voice Call Continuity Directory Number (VDN) in the 3GPP2 standards, or a Session Transfer Number for Single Radio (STN-SR) in the 3GPP standard). According to an existing solution, the handover process may be initiated by the packet-switched network when it detects the appropriate conditions. The packet-switched network instructs the handset, while still engaged in a call, to send a message towards the circuit-switched network to originate a second call. The call is placed to either the VDN or STN-SR. In the existing solution, the VDN or STN-SR is a static value, provisioned by the wireless device's home service provider. In such circumstances, the VDN or STN-SR represents a destination in the wireless device's home network provider's network. This results in the switching of the bearer (voice) path of the call occurring in the home network, even when the wireless device is roaming on other networks. Routing the voice path back to the wireless device's home network, regardless of where the other end point is, can result in several undesirable impacts. For example, switching of the bearer (voice) path in the home network may cause increased delays in the circuit-switched call setup process. As another example, it may result in delay due to SIP/SDP signaling updates for the packet-switched leg of the call that may need to be routed all the way to another wireless device, which may also be roaming.

SUMMARY

To address the foregoing problems with existing solutions, disclosed is a method in a wireless device for voice call continuity. The wireless device sends a register message to a network node. The wireless device has a first session transfer number. The wireless device receives a registration authorization message. The registration authorization message includes a second session transfer number for voice call continuity, the second session transfer number being dynamically assigned by the network node. The wireless device stores in memory the dynamically assigned second session transfer number.

In certain embodiments, the wireless device may use the dynamically assigned second session transfer number in subsequent single radio voice call continuity actions. For example, the wireless device may receive a message indicating that a call associated with the wireless device should be handed over to a circuit-switched network. The wireless device may generate a call origination message having the dynamically assigned second session transfer number as the destination, and send the call origination message to a mobile switching center.

Also disclosed is a network node. The network node has one or more processors configured to receive a register message from a wireless device attempting to register with the network node. The wireless device may have a first session transfer number for voice call continuity. The one or more processors are configured to dynamically assign a second session transfer number to the wireless device, and to communicate a registration authorization message to the wireless device. The registration authorization message includes the second session transfer number dynamically assigned to the wireless device.

Also disclosed is a method in a network node for voice call continuity. The network node receives, from a second network node with which a wireless device having a first session transfer number has registered, a registration notification message. The registration notification message includes a second session transfer number dynamically assigned to the wireless device by the second network node for voice call continuity. The network node stores in memory the dynamically assigned second session transfer number. The network node receives, from a mobile switching center, a network query message, the network query message sent in response to the mobile switching center receiving a call origination message from the wireless device. The call origination message includes the first session transfer number as a destination. The network node determines that there is an active call involving the wireless device that sent the call origination message, and sends a network query response message to the mobile switching center that includes the dynamically assigned second session transfer number.

In certain embodiments, the network node may include a voice call continuity application server. The dynamically assigned second session transfer number may be stored in the voice call continuity application server. The network node may be associated with a home network of the wireless device, and the second network node may be associated with a visited network. The network query message may be an Origination Request. The first session transfer number may represent a destination in a home network of the wireless device. The dynamically assigned second session transfer number may represent a destination in a visited network.

Also disclosed is a method in a network node for voice call continuity. The network node receives a register message from a wireless device. The wireless device has a first session transfer number. The network node dynamically assigns a second session transfer number to the wireless device for voice call continuity, and sends a registration notification message including the dynamically assigned second session transfer number for the wireless device and an identity of the network node to a second network node. The network node sends a registration authorization message to the wireless device.

Also disclosed is a method in a wireless device for voice call continuity. The wireless device receives a message indicating that a call associated with the wireless device should be handed over to a circuit-switched network, and generates a call origination message. The call origination message includes a first session transfer number as a destination. The wireless device sends the call origination message including the first session transfer number to a mobile switching center, wherein the first session transfer number is replaced with a dynamically assigned second session transfer number by the mobile switching center.

Also disclosed is a method in a mobile switching center. The mobile switching center receives a call origination message from a wireless device. The call origination message has a first session transfer number as a destination. The mobile switching center generates a network query message having the first session transfer number as a destination and an identity of the wireless device as an initiator, and sends the network query message to a network node. The mobile switching center receives a network query response message including a dynamically assigned second session transfer number for the wireless device. The mobile switching center replaces the first session transfer number with the dynamically assigned second session transfer number, and initiates an outgoing call to the dynamically assigned second session transfer number.

Certain embodiments of the present disclosure may provide one or more technical advantages. For example, using the dynamically assigned second session transfer number may allow for local anchoring of the bearer path. As another example, it may provide faster updating of the bearer path during handover. As yet another example, using the dynamically assigned second session transfer number may remove the need for signaling all the way to the other end point during call handover.

BRIEF DESCRIPTION OF THE DRAWINGS

For a more complete understanding of the disclosed embodiments and their features and advantages, reference is now made to the following description, taken in conjunction with the accompanying drawings, in which:

FIG. 5 illustrates an example message of the signal flow illustrated in FIG. 2, according to an embodiment;

FIG. 6 is a flow diagram illustrating an example method for facilitating voice call continuity by a wireless device, according to a particular embodiment;

FIG. 8 illustrates an example message of the signal flow illustrated in FIG. 2, according to a particular embodiment;

DETAILED DESCRIPTION

Figure 1:
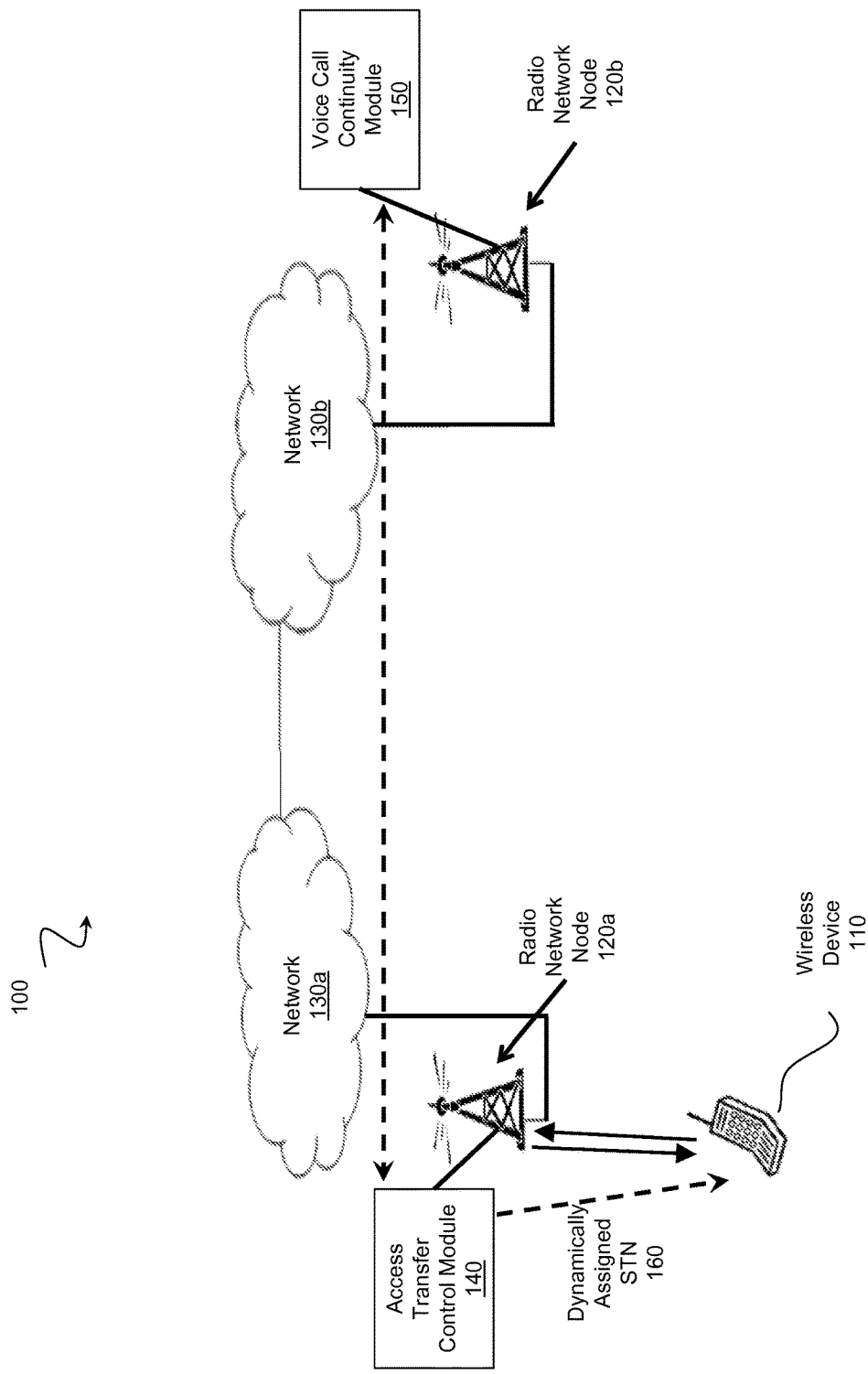
FIG. 1 is a block diagram illustrating an example of a wireless network that includes one or more wireless devices and a plurality of network nodes.

FIG. 1 is a block diagram illustrating an example of a wireless network 100 that includes one or more wireless devices 110 and a plurality of network nodes 120. Network nodes 120a and 120b may be any suitable type of network node, such as a base station, eNodeB, or core network node. Wireless device 110 communicates with radio network nodes 120a and 120b over a wireless interface. For example, wireless device 110 transmits wireless signals to radio network node 120a and/or receives wireless signals from radio network node 120a. The wireless signals contain voice traffic, data traffic, and control signals, for example. In certain embodiments, radio network node 120a or 120b may be a core network node and manage the establishment of communication sessions and various other functionality for wireless device 110. The network nodes connect through interconnecting networks 130a and 130b, which refer to any interconnecting system capable of transmitting audio, video, signals, data, messages, or any combination of the preceding. Examples of wireless device 110 and radio network node 120 are described with respect to FIGS. 12 and 13, respectively.

In certain embodiments, radio network nodes 120a and 120b may include one or more modules. As one example, radio network node 120a may include an access transfer control module 140, and radio network node 120b may include a voice call continuity application module 150. In certain embodiments, access transfer control module 140 may include access transfer control function. Access transfer control module 140 may be any suitable configuration of hardware and/or software. In certain embodiments access transfer control module 140 may dynamically assign a session transfer number, such as dynamically assigned session transfer number 160.

Voice call continuity module 150 may be any suitable configuration of hardware and/or software. In certain embodiments, voice call continuity module 150 may be a voice call continuity application server or a session centralization and continuity application server. Voice call continuity module 150 may store a session transfer number dynamically assigned to wireless device 110, such as session transfer number 160 dynamically assigned to wireless device 110 by access transfer control module 140.

In certain embodiments, networks 130*a* and 130*b* may be packet-switched networks. As one example, networks 130*a* and 130*b* may be networks in an IP Multimedia Subsystem (IMS) network. More particularly, networks 130*a* and 130*b* may be LTE networks. In certain embodiments, network 130*b* may be a home network of wireless device 110, and network 130*a* may be a visited network of wireless device 110. Wireless device 110 may associate with a visited network such as network 130*a* for any suitable reason. As one example, wireless device 110 may register with network 130*a* in order to make and receive calls while wireless device 110 is roaming.

While registered with network 130*a*, wireless device 110 may engage in a call. During the call, network 130*a* may determine that the call needs to be handed over to a circuit-switched network in order to maintain the call. Network 130*a* may determine that the call needs to be handed over for any suitable reason. As one example, network 130*a* may determine that the call should be handed over because a radio signal level being reported by wireless device 110 is too weak.

In certain embodiments, wireless device 110 may be provisioned with a first session transfer number, such as the VDN or STN-SR described above. Existing solutions require wireless device 110 to use this provisioned first session transfer number during handover of the call from the packet-switched network to the circuit-switched network. As described above, using the provisioned first session transfer number during handover of a call to the circuit-switched network has certain disadvantages, such as requiring that the voice call continuity call be made to the provisioned first session transfer number pointing to its home network. In many instances, it may be beneficial to dynamically assign a second session transfer number to be used in handing over the call to a circuit-switched network. The present disclosure contemplates various embodiments for providing a dynamically assigned second session transfer number for use in providing voice call continuity.

According to a particular embodiment, wireless device 110 may store dynamically assigned second session transfer number 160 for use in subsequent voice call continuity actions, such as during handover of a call from a packet-switched network to a circuit-switched network. In such an embodiment, wireless device 110 may attempt to register with network 130*a*. As described above, network 130*a* may be a visited network in which wireless device 110 is roaming. Network 130*a* may have a local anchoring point associated with it. For example, network 130*a* may include an access transfer control module 140. During the registration process, access transfer control module 140 of network 130*a* may dynamically assign a second session transfer number to wireless device 110.

The second session transfer number dynamically assigned to wireless device 110 may, for example, be a VDN or STN-SR. The dynamically assigned second session transfer number may be selected from one or more session transfer numbers associated with access transfer control module 140 of network 130*a*. The dynamically assigned second session transfer number may provide for local anchoring of the bearer path in the visited network during handover of the call to a circuit-switched network. In certain embodiments, the network node 120A including access transfer control module 140 that dynamically assigns the second session transfer number 160 may be determined based on load balancing, geography, availability, failed node avoidance, or any other suitable criteria. As part of the registration process, dynamically assigned second session transfer number 160 may be provided to wireless device 110's home network, such as, for example, network 130*b*. In certain embodiments, additional information may be provided. As one example, the identity of the access transfer control module 140 that dynamically assigned second session transfer number 160 may be provided.

If the registration is successful, network 130*a* may include dynamically assigned second session transfer number 160 in a registration authorization message to wireless device 110. As one example, the registration authorization message may be a 2000K success response. Wireless device 110 may store dynamically assigned session transfer number 160 for the duration of wireless device 110's registration with network 130*a*. For example, wireless device 110 may store dynamically assigned second session transfer number 160 in memory.

Wireless device 110 may use dynamically assigned second session transfer number 160 for subsequent voice call continuity actions. For example, at some point during wireless device 110's registration with network 130*a*, wireless device 110 may be participating in an active call that needs to be handed over to the circuit-switched network. In such circumstances, wireless device 110 may generate a call origination message having dynamically assigned second session transfer number 160 as the destination, instead of the provisioned first session transfer number.

Using dynamically assigned second session transfer number 160 instead of a provisioned first session transfer number during call handover may provide a number of advantages. As one example, dynamically assigned second session transfer number 160 may allow for local anchoring of the bearer path. As another example, it may provide faster updating of the bearer path during handover. As yet another example, using the dynamically assigned second session transfer number may remove the need for signaling all the way to the other end point during call handover.

As described above, dynamically assigned second session transfer number 160 may be assigned to wireless device 110 during registration with network 130*a*. Network 130*a* may be a visited network for wireless device 110, while network 130*b* may be a home network of wireless device 110. In some embodiments, wireless device 110 may register with network 130*a*. Network 130*a* may have a local anchoring point associated with it. For example, network 130*a* may include access transfer control module 140. During registration of wireless device 110 with network 130*a*, access transfer control module 140 may dynamically assign a second session transfer number 160 to wireless device 110. As described above, second session transfer number 160 may be a VDN or an STN-SR. In certain embodiments, access transfer control module 140 may select second session transfer number 160 from one or more session transfer numbers associated with network 130*a*. In certain embodiments, the network node 120A including access transfer control module 140 that dynamically assigns the second session transfer number 160 may be determined based on load balancing, geography, availability, failed node avoidance, or other suitable criteria.

According to some embodiments, during the registration process dynamically assigned second session transfer number 160 may be provided in a registration notification message to a home network of wireless device 110, such as network 130b. In certain embodiments, the registration notification message may include other suitable information in addition to dynamically assigned session transfer number 160, As one example, the registration notification message may include the identity of the access transfer control module 140 that assigned the second session transfer number, or the identity of wireless device 110.

In certain embodiments, the registration notification message may be provided to voice call continuity module 150 associated with network 130b. As described above, network 130b may be the home network of wireless device 110. In certain embodiments, voice call continuity module 150 may be a voice call continuity application server according to the 3GPP2 standard, or a session centralization and continuity application server according to the 3GPP standard. The present disclosure contemplates that voice call continuity module 150 may be any suitable combination of hardware and/or software for storing dynamically assigned second session transfer number 160. In addition to storing dynamically assigned second session transfer number 160, voice call continuity module 150 may perform any other suitable functions. In certain embodiments, voice call continuity module 150 may store dynamically assigned second session transfer number 160 and the identity of the assigning access transfer control module 140. In certain embodiments, voice call continuity module 150 may use the identity of wireless device 110 as a key for storing dynamically assigned second session transfer number 160. In certain embodiments, a registration confirmation message may be sent to wireless device 110. The registration confirmation message may include the identity of voice call continuity module 150. In certain embodiments, access transfer control module 140 may store the identity of voice call continuity module 150, using the identity of wireless device 110 as the key.

After registering with network 130a, wireless device 110 may engage in a call, such as a voice over LTE call. In certain embodiments, the call signaling may be routed via access transfer control module 140 and voice call continuity module 150, resulting in both voice call continuity module 150 and access transfer control module 140 being aware that wireless device 110 is involved in an active call. In certain embodiments, voice call continuity module 150 and access transfer control module 140 may remain in the signaling path, and may know when the call ends.

In some circumstances, wireless device 110 may receive an indication that the call should be handed over to a circuit-switched network. For example, network 130a may detect signal fading, and instruct wireless device 110 to handover. In response, wireless device 110 may generate a call origination message to a mobile switching center (MSC) as part of a move to the circuit-switched network. In certain embodiments, the call origination message from wireless device 110 includes the provisioned session transfer number as the destination. In certain embodiments, the mobile switching center is configured to send a network query message for wireless device 110 in response to the call origination message. For example, the network query message may be an Origination Request to a known node in the home network of wireless device 110, such as network node 120b in network 130b. In certain embodiments, the decision to query a node, such as network node 120b in the home network, may be controlled by the use of WIN triggers. Such triggers may be obtained as part of the validation of wireless device 110 by the circuit-switched network as part of established circuit-switch calling procedures. In certain embodiments, this known node 120b may include voice call continuity module 150. In certain embodiments, the node may be a pre-existing node, such as a Service Control Point used in ANSI networks, which in turn recognizes the intended destination and forwards it to voice call continuity module 150.

In certain embodiments, voice call continuity module 150 determines wireless device 110's identity, which may be provided in the query from the mobile switching center, and compares it against active calls it is handling. In certain embodiments, voice call continuity module 150 may determine that wireless device 110 is already involved in an ongoing call in network 130a. Voice call continuity module 150 may use wireless device 110's identity to retrieve the saved dynamically assigned second session transfer number 160, and return it in a response to the mobile switching center's query.

In certain embodiments, the mobile switching center may replace the provisioned session transfer number included in the call origination message from wireless device 110 with dynamically assigned second session transfer number 160 included in the query response, and place an outgoing call to the dynamically assigned session transfer number. This, in turn, results in the call being routed to the access transfer control module 140 that assigned it. Such an approach may offer the same or similar advantages to those described above.

Figure 2:
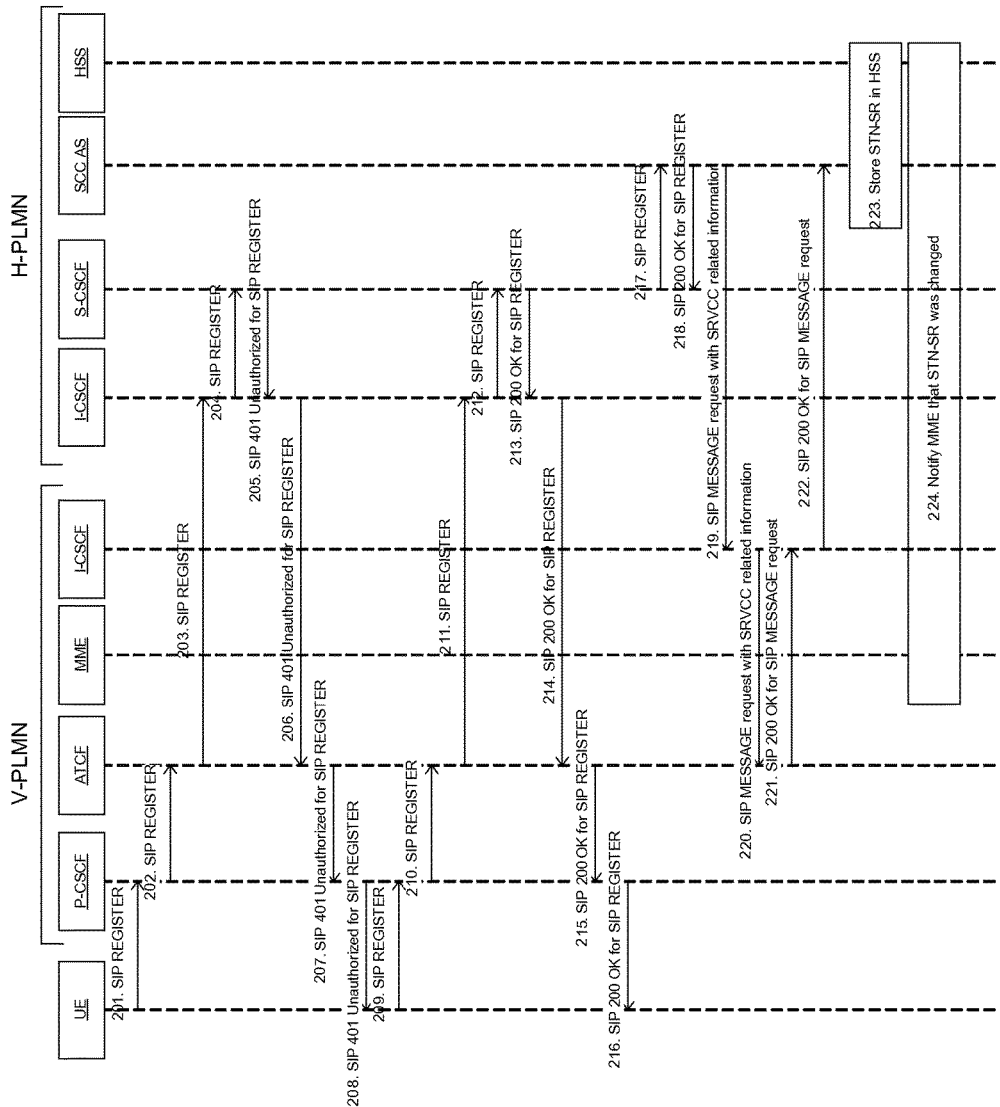
FIG. 2 illustrates a signal flow in accordance with certain embodiments.

FIG. 2 illustrates a signal flow in accordance with certain embodiments. More particularly, FIG. 2 illustrates a signal flow between a user equipment (UE), a visited public land mobile network (V-PLMN), and a home public land mobile network (H-PLMN). In certain embodiments, the UE, V-PLMN, and H-PLMN of FIG. 2 may be wireless device 110, network 130a, and network 130b, respectively, as described above in relation to FIG. 1.

Steps 201 through 214 illustrate a user equipment, such as wireless device 110, registering with visited network V-PLMN. In certain embodiments, the user equipment may be roaming. As described above, in certain embodiments wireless device may have a second session transfer number, such as second transfer number 160 described above, dynamically assigned to it during registration with the visited network. The second session transfer number may be dynamically assigned by an access transfer control module, such as the access transfer control function (ATCF) associated with the V-PLMN of FIG. 2. In certain embodiments, at step 203 and/or 211 the access transfer control module may communicate a registration authorization message including the dynamically assigned second session transfer number. At step 216, the registration authorization message including the dynamically assigned second session transfer number may be received by the user equipment as part of a registration authorization message. In certain embodiments, and as illustrated in FIG. 2, the registration authorization message may be a SIP 200 OK for SIP Register message.

As described above, in some embodiments a dynamically assigned second session transfer number may be stored in a voice call continuity module, such as the voice call continuity module 150 described above in relation to FIG. 1. In certain embodiments, and as illustrated in FIG. 2, the voice call continuity module may be a session centralization and continuity application server (SCC-AS). At step 217, the dynamically assigned second session transfer number is sent to the SCC-AS. In certain embodiments, the registration notification message may be a SIP Register message such as the one illustrated in step 217. Steps 218 through 224 illustrate the remaining steps of the user equipment's registration process and exchange of node identities with V-PLMN, according to certain embodiments. As one example, the exchange of node identities may include the SCC-AS identity being provided back to the ATCF.

Figure 3:
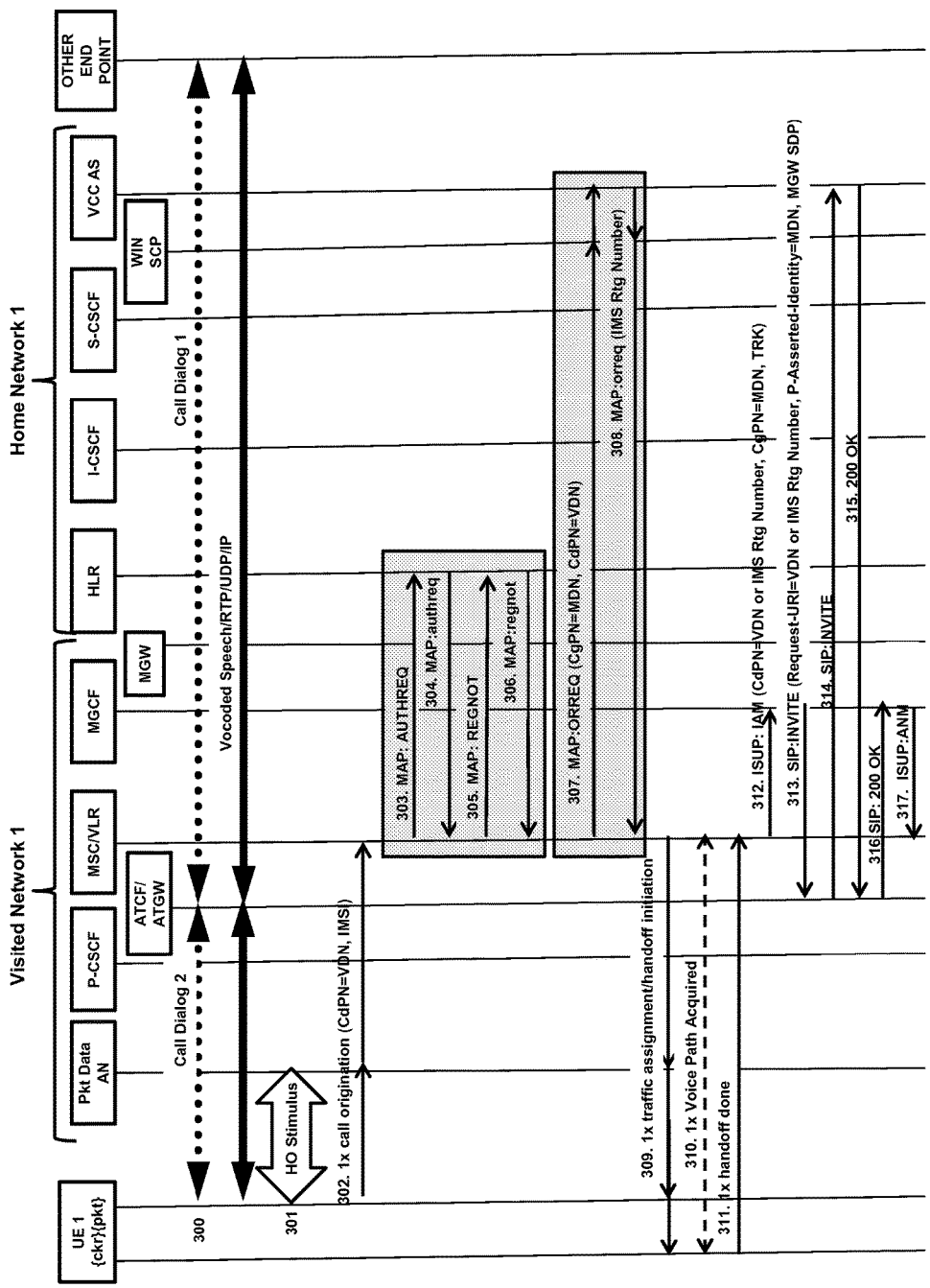
FIGS. 3 and 4 illustrate a call flow during a single-radio voice call continuity handover, according to certain embodiments.
Figure 4:
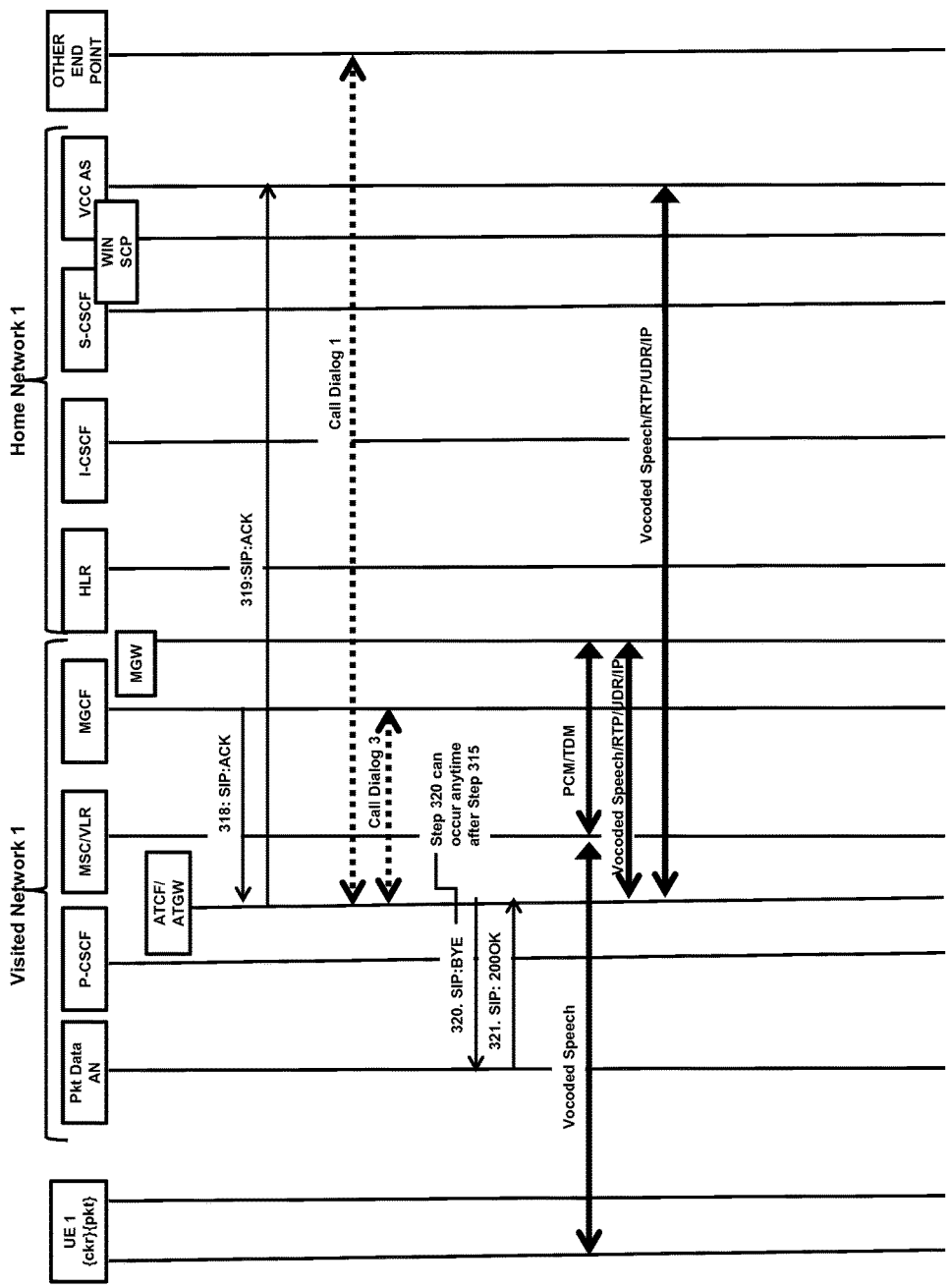

FIGS. 3 and 4 illustrate a call flow during a single-radio voice call continuity handover, according to some embodiments. At step 300, the wireless device has already established a voice call over the packet-switched network and the signaling and bearer for the call have been anchored at the ATCF and the associated ATGW bearer gateway. At step 301, the UE, such as wireless device 110 described above in relation to FIG. 1, receives a handover stimulus. As one example, the handover stimulus may be an indication that the signal from the packet-switched network is too weak. At step 302, the UE sends a call origination message to a mobile switching center. In certain embodiments, the call origination message has the first session transfer number as its destination. Steps 303 and 304 illustrate an optional authentication step. Steps 305 and 306 illustrate an optional Registration step with the circuit-switched network if the user is not already known. At step 307, the mobile switching center sends a network query message to the voice call continuity application server (VCC-AS) of the home network. In certain embodiments, and as illustrated in FIG. 3, the network query message may be an Origination Request. In certain embodiments, the network query message may be sent via a service control point (SCP).

At step 308, the VCC-AS returns a message in response to the mobile switching center's Origination Request. In certain embodiments, the response message may include a dynamically assigned second session transfer number, such as dynamically assigned second session transfer number 160 described above in relation to FIG. 1. In certain embodiments, the dynamically assigned second session transfer number may be returned as an IMS routing number. In certain embodiments, the mobile switching center may replace the first session transfer number included in the call origination message at Step 302 with the dynamically assigned second session transfer number, and place an outgoing call to that number. At step 309, handoff of the call is initiated, and at step 310, the circuit-switched portion of the voice path is acquired.

At step 311, the UE sends a 1× handoff done message to the mobile switching center. At steps 312 and 313, the mobile switching center sends a call origination message to the ATCF of the visited network. In certain embodiments, the call origination message may be sent via the MGCF if the MSC is not SIP capable. At step 314, the ATCF sends a SIP:Invite message to the VCC-AS of the home network to inform it of the intended handoff. At steps 315 through 317, the VCC-AS and ATCF acknowledge the Origination Request messaging. At steps 318 and 319, the SIP dialogs receive the necessary SIP:ACK messages, and a new dialog is established between the MGCF and the ATCF where the user's call was anchored during the setup of the initial packet-switched call 300. At step 320, a SIP: BYE message is sent to formally end the packet-switched leg of the call. In certain embodiments, step 320 may be completed any time after step 315. In this manner, the call may be handed over from the packet-switched network to the circuit-switched network.

FIG. 5 illustrates an example message of the signal flow illustrated in FIG. 2, according to certain embodiments. As described above in relation to FIG. 1, a wireless device such as wireless device 110 may receive a registration authorization message containing a dynamically assigned second session transfer number, such as second session transfer number 160 described above. In certain embodiments, the registration authorization message may be a SIP 200 OK message. Message 500 is an example registration authorization message such as the one shown in FIG. 2 as messages 215 and 216. In certain embodiments, message 500 includes dynamically assigned second session transfer number 510.

FIG. 6 is a flow diagram illustrating an example method 600 for facilitating voice call continuity by a wireless device, according to a particular embodiment. The method begins at step 604, where the wireless device sends a register message to a network node. In certain embodiments, the wireless device may have a first session transfer number associated with it, and the network node may be a network node in a visited network. In certain embodiments, the network node may have an access transfer control module associated with it. At step 608, the wireless device receives a registration authorization message. In certain embodiments, the registration authorization message includes a dynamically assigned second session transfer number for voice call continuity. In certain embodiments, the second session transfer number is dynamically assigned by the network node. The second session transfer number may be selected from one or more session transfer numbers associated with the network node, and may be assigned based on any suitable criteria. In certain embodiments, the network node that dynamically assigns the second session transfer number may be determined based on one or more of load balancing, geography, availability, or failed node avoidance.

At step 612, the wireless device stores the dynamically assigned second session transfer number in memory. At step 616, the wireless device receives a message indicating that a call associated with the wireless device should be handed over to a circuit-switched network. For example, a call that originated in a packet-switched network, such as an LTE network, may need to be handed over to a circuit-switched network, such as a CDMA network. In certain embodiments, the message received by the wireless device indicating that the call associated with the wireless device should be handed over may be generated in response to a determination that the signal from the packet-switched network is too weak, but that a useable signal is still available for the traditional circuit-switched network. In certain other embodiments, the message may be generated in response to any suitable circumstances.

At step 620, the wireless device generates a call origination message. In certain embodiments, the call origination message has the dynamically assigned second session transfer number as the destination. At step 624, the wireless device sends the call origination message to a mobile switching center. In certain embodiments, the mobile switching center may initiate a call routed to the dynamically assigned second transfer number for voice call continuity.

Figure 7:
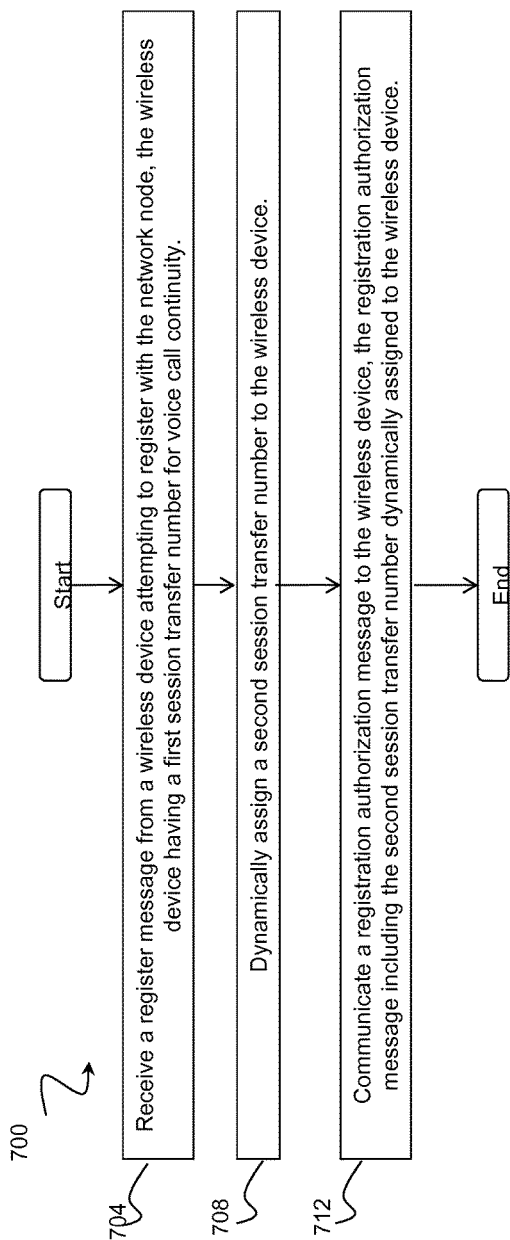
FIG. 7 is a flow diagram illustrating an example method for facilitating voice call continuity by a network node, according to a particular embodiment.

FIG. 7 is a flow diagram illustrating an example method 700 for facilitating voice call continuity by a network node, according to a particular embodiment. The method begins at step 704, where the network node receives a register message from a wireless device attempting to register with the network node. In certain embodiments, the network node may be a network node in a visited network in which the wireless device is roaming. In certain embodiments, the wireless device may be provisioned with a first session transfer number for voice call continuity.

At step 708, the network node dynamically assigns a second session transfer number to the wireless device. In certain embodiments, the network node dynamically assigning the second session transfer number to the wireless device may have access control transfer function and serve as a local anchoring point in a visited network. In certain embodiments, the second session transfer number dynamically assigned to the wireless device may be selected from one or more session transfer numbers associated with the network node. In certain embodiments, the network node that dynamically assigns the second session transfer number may be determined based on load balancing, geography, availability, failed node avoidance, or any other suitable criteria.

At step 712, the network node communicates a registration authorization message to the wireless device. In certain embodiments, the registration authorization message may include the second session transfer number dynamically assigned to the wireless device. In certain embodiments, the network node may also communicate a registration notification message to a voice call continuity application server of a home network of the wireless device.

Figure 8:
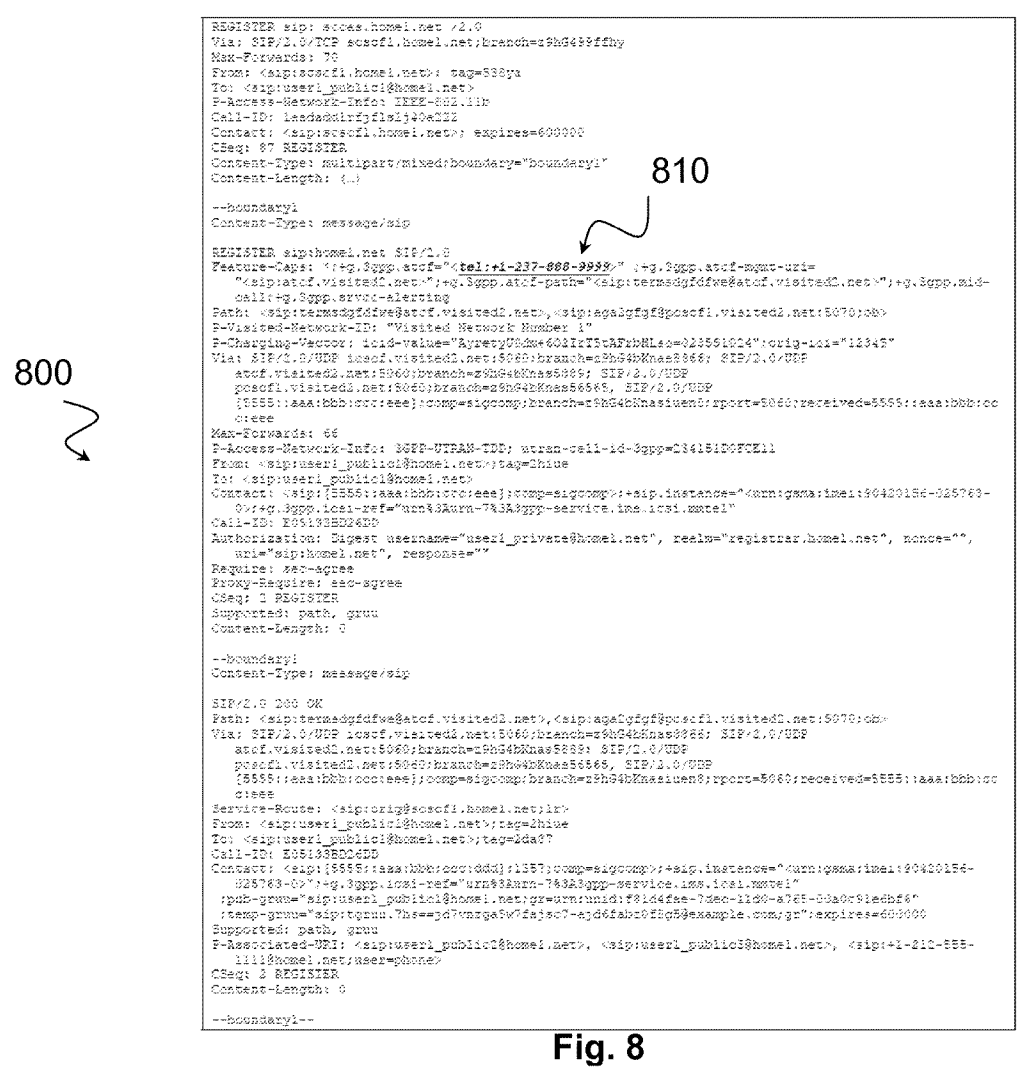

FIG. 8 illustrates an example message of the signal flow illustrated in FIG. 2, according to an embodiment. As described above, in certain embodiments a second session transfer number may be dynamically assigned to a wireless device. The dynamically assigned second session transfer number may be included in a registration notification message sent to a voice call continuity module, such as a voice call continuity application server, as part of the registration process. In certain embodiments, the registration notification may be a 3rd Party Register message. Message 800 is an example registration notification message, such as the one shown in FIG. 2 as message 217. Message 800 includes dynamically assigned second session transfer number 810.

Figure 9:
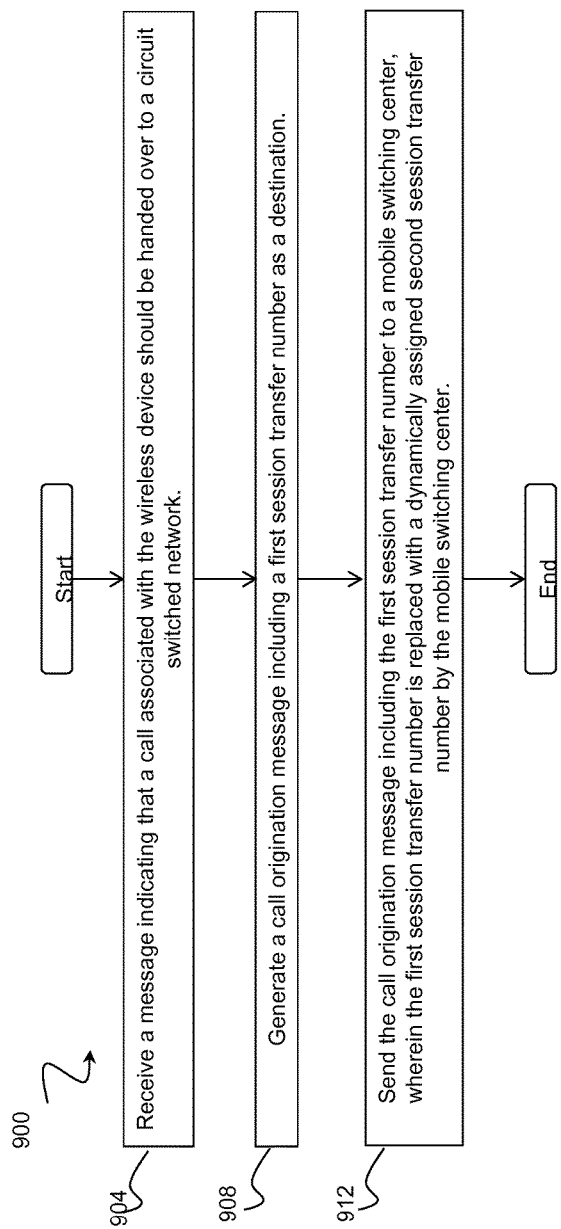
FIG. 9 is a flow diagram illustrating an example method for facilitating voice call continuity in a wireless device, according to a particular embodiment.

FIG. 9 is a flow diagram illustrating an example method 900 for facilitating voice call continuity in a wireless device, according to a particular embodiment. The method begins at step 904, where the wireless device receives a message indicating that a call associated with the wireless device should be handed over to a circuit switched network. In certain embodiments, the message indicating that a call associated with the wireless device should be handed over may be generated in response to a determination that the available signal from a packet-switched network, such as an LTE network, is too weak to be useable, but a useable signal is available from the circuit-switched network. In certain embodiments, the wireless device has a first session transfer number associated with it.

At step 908, the wireless device generates a call origination message, the call origination message including the first session transfer number as the destination. In certain embodiments, the first session transfer number may represent a destination in a home network of the wireless device. At step 912, the wireless device sends the call origination message to a mobile switching center. In certain embodiments, the call origination message may be sent to the mobile switching center in a tunneling protocol via a packet-switched network. In certain embodiments, the first session transfer number may be replaced with the dynamically assigned second session transfer number by the mobile switching center. In certain embodiments, the mobile switching center may initiate a call routed to the dynamically assigned second session transfer number for voice call continuity. In certain embodiments, the second session transfer number represents a destination in a visited network of the wireless device.

Figure 10:
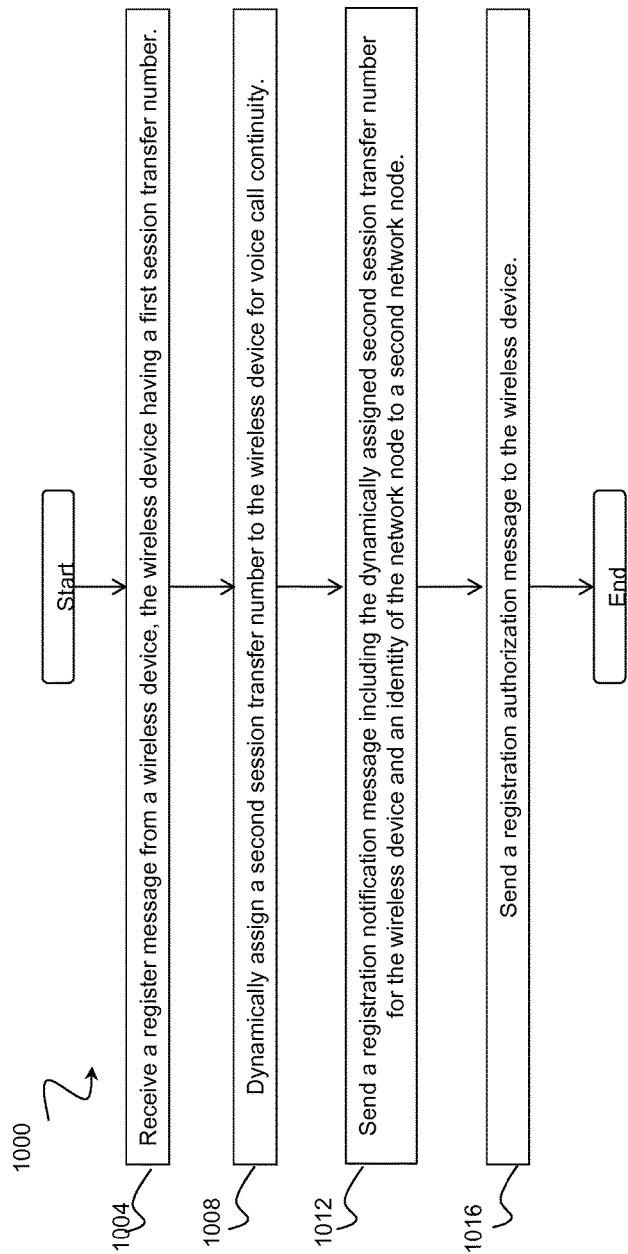
FIG. 10 is a flow diagram illustrating an example method for facilitating voice call continuity in a network node, according to a particular embodiment.

FIG. 10 is a flow diagram illustrating an example method 1000 for facilitating voice call continuity in a network node, according to a particular embodiment. The method begins at step 1004, where the network node receives a register message from a wireless device. In certain embodiments, the wireless device may have a first session transfer number associated with it. In certain embodiments, the network node may be a network node in a visited network in which the wireless device is roaming, such as network 120a described above in FIG. 1. In certain embodiments, the network node may be a local anchoring point having access transfer control functionality, such as access transfer control module 140 described above in FIG. 1.

At step 1008, the network node dynamically assigns a second session transfer number to the wireless device for voice call continuity. In certain embodiments, the second session transfer number may be selected from one or more session transfer numbers associated with the network node. In certain embodiments, the network node that dynamically assigns the second session transfer number may be determined based on load balancing, geography, availability, failed-node avoidance, or any other suitable criteria.

At step 1012, the network node sends a registration notification message to a second network node. The second network node may be a node in the wireless device's home network. The second network node may include a voice call continuity module. For example, the second network node may include a voice call continuity application server or a session centralization and continuity application server. In certain embodiments, the registration notification message includes the second session transfer number dynamically assigned to the wireless device. In certain embodiments, the registration notification message may also include the identity of the network node that assigned the second session transfer node, or other suitable information. In certain embodiments, the registration notification message may be sent to the voice call continuity application server of a second network node. The voice call continuity application server may store the dynamically assigned second session transfer number. At step 1016, the network node sends a registration authorization message to the wireless device.

Figure 11:
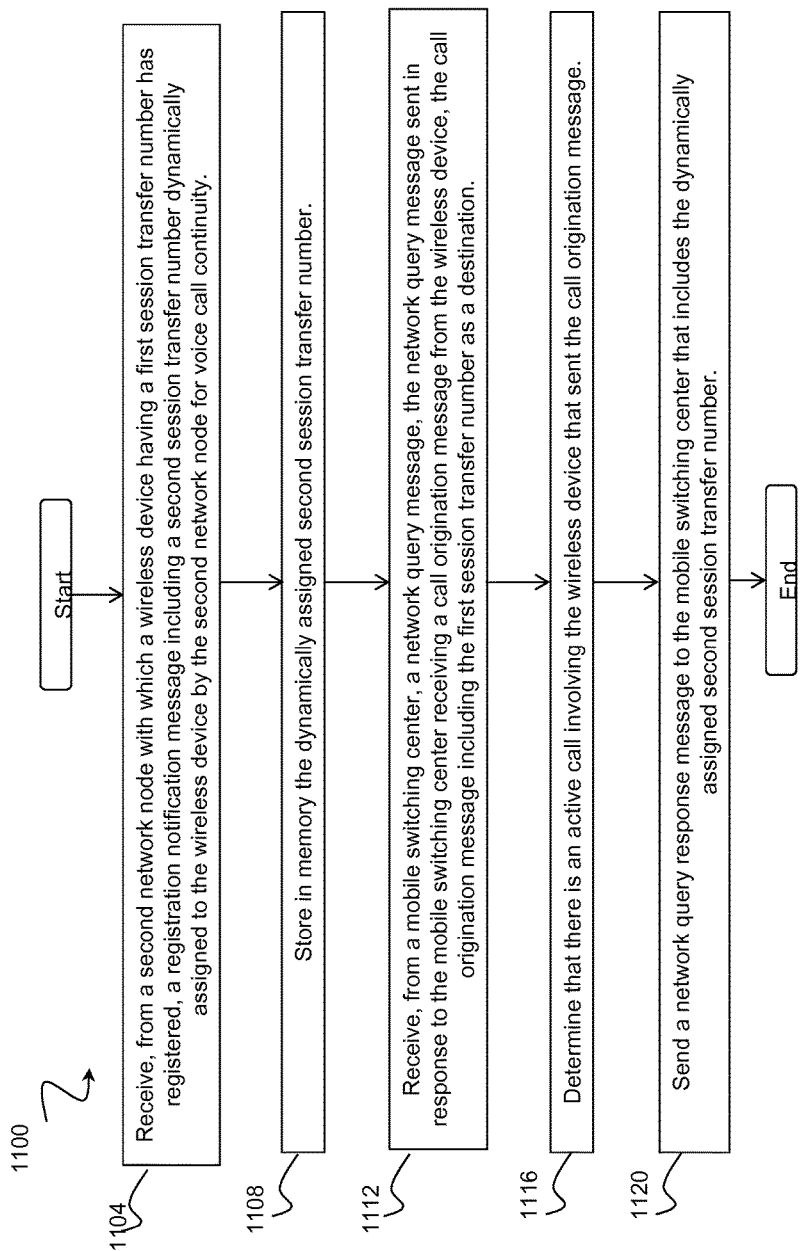
FIG. 11 is a flow diagram illustrating an example method for facilitating voice call continuity in a network node, according to a particular embodiment.

FIG. 11 is a flow diagram illustrating an example method 1100 for facilitating voice call continuity in a network node, according to a particular embodiment. The method begins at step 1104, where the network node receives, from a second network node with which a wireless device having a first session transfer number has registered, a registration notification message. The registration notification message may include a second session transfer number dynamically assigned to the wireless device by the second network node for voice call continuity. In certain embodiments, the network node may be a network node in the wireless device's home network. In certain embodiments, the second network node may be a network node of a visited wireless network in which the wireless device is roaming.

At step 1108, the network node stores the dynamically assigned second session transfer number in memory. In certain embodiments, the dynamically assigned second session transfer number may be stored in a voice call continuity application server associated with the network node. At step 1112, the network node receives, from a mobile switching center, a network query message. In certain embodiments, the network query message may be an Origination Request. In certain embodiments, the network query message may be sent by the mobile switching center in response to receiving a call origination message from the wireless device. The call origination message may include the first session transfer number as a destination. The first session transfer number may represent a destination in the wireless device's home network. In certain embodiments, the call origination message may have been generated by the wireless device in response to a determination that a call should be handed over from the packet-switched network to a circuit-switched network.

At step 1116, the network node determines that there is an active call associated with the wireless device that sent the call origination message. At step 1120, the network node sends a network query response message to the mobile switching center that includes the dynamically assigned second session transfer number. In certain embodiments, the dynamically assigned second session transfer number may represent a destination in a visited network in which the wireless device has registered.

Figure 12:
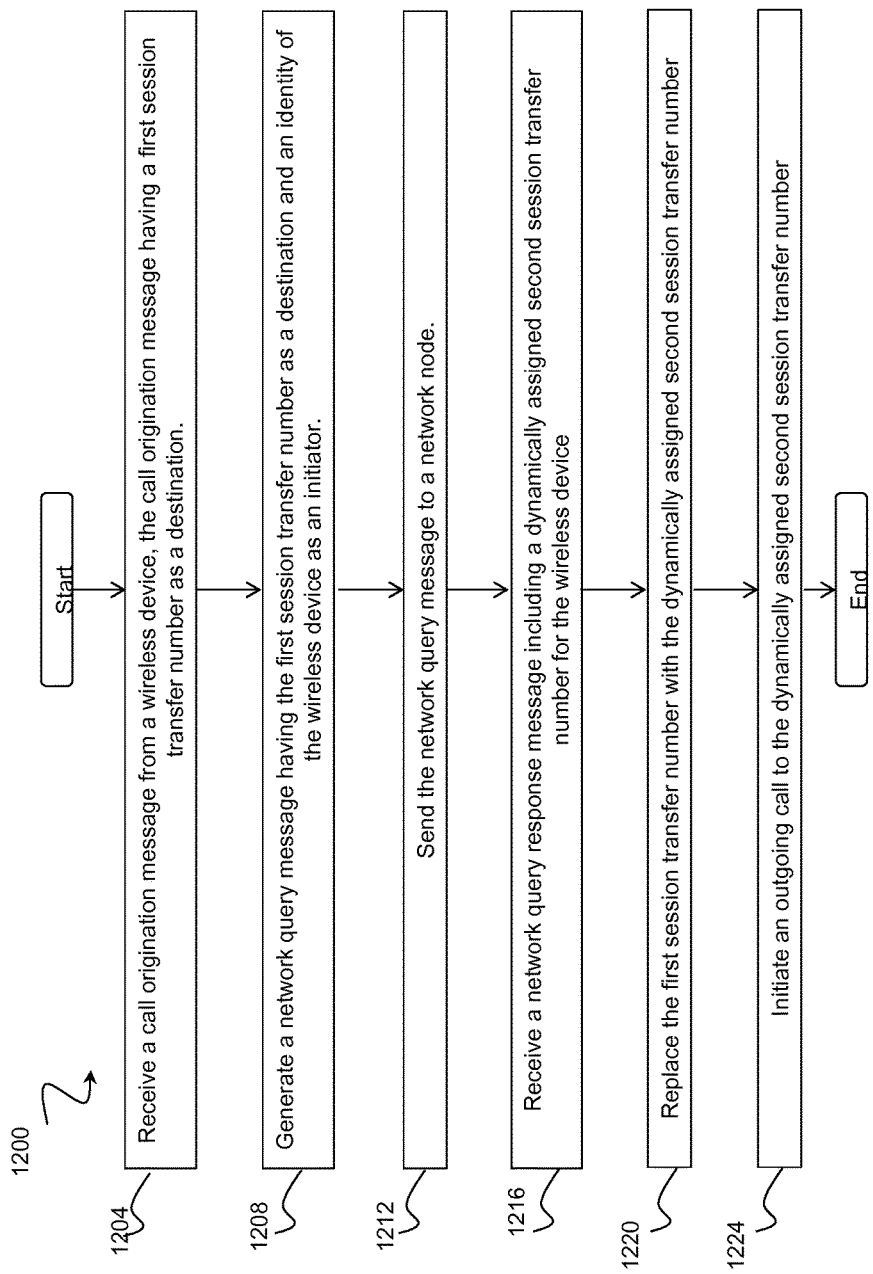
FIG. 12 is a flow diagram illustrating an example method for facilitating voice call continuity in a mobile switching center, according to a particular embodiment.

FIG. 12 is a flow diagram illustrating an example method 1200 for facilitating voice call continuity in a mobile switching center, according to a particular embodiment. At step 1204, the mobile switching center receives a call origination message from a wireless device. In certain embodiments, the call origination message has a first session transfer number as a destination. In certain embodiments, the first session transfer number represents a destination in a home network of the wireless device. At step 1208, the mobile switching center generates a network query message having the first session transfer number as a destination and an identity of the wireless device as an initiator. At step 1212, the mobile switching center sends the network query message to a network node. In certain embodiments, the network node is associated with a home network of the wireless device. In certain embodiments, the network node may be a voice call continuity application server configured to store a dynamically assigned second session transfer number for the wireless device.

At step 1216, the mobile switching center receives a network query response message including a dynamically assigned second session transfer number for the wireless device. In certain embodiments, the dynamically assigned second session transfer number represents a destination in a visited network. At step 1220, the mobile switching center replaces the first session transfer number with the dynamically assigned second session transfer number. At step 1224, the mobile switching center initiates an outgoing call to the dynamically assigned second session transfer number.

Figure 13:
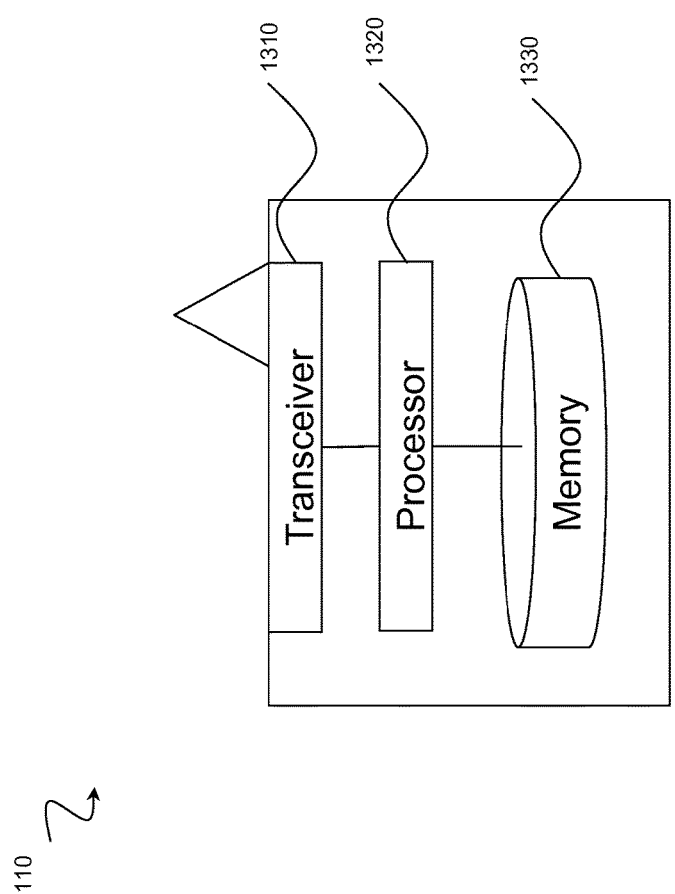
FIG. 13 is a block schematic of an exemplary wireless device suitably operative in accordance with particular embodiments.

FIG. 13 is a block schematic of an exemplary wireless device 110 suitably operative in accordance with particular embodiments. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless device 110 includes at least a transceiver 1310, a processor 1320, and a memory 1330. In some embodiments, transceiver 1310 facilitates transmitting wireless signals to and receiving wireless signals from radio network node 120 (e.g., via an antenna), processor 1320 executes instructions to provide some or all of the functionality described herein as provided by a wireless device 110, and memory 1330 stores the instructions executed by processor 1320.

Processor 1320 includes any suitable combination of hardware and software implemented in one or more integrated circuits or modules to execute instructions and manipulate data to perform some or all of the described functions of wireless device 110. Memory 1330 is generally operable to store computer executable code and data. For example, in certain embodiments memory 1330 may store a dynamically assigned second session transfer number. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Embodiments of wireless device 110 may include additional components (beyond those shown in FIG. 13) responsible for providing certain aspects of the mobile device's functionality, including any of the functionality described above and/or any additional functionality (including any functionality necessary to support the solution described above).

Figure 14:
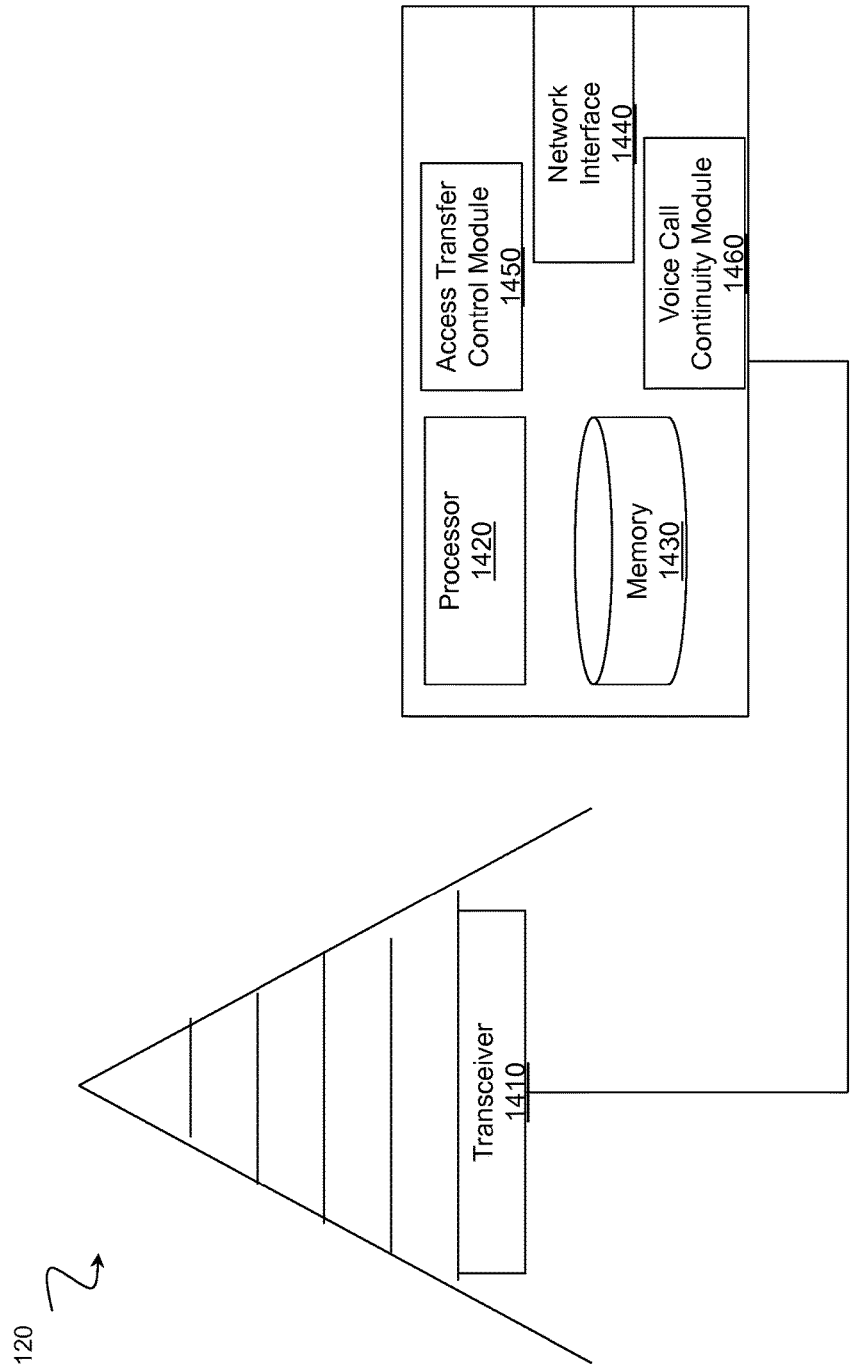
FIG. 14 is a block schematic of an exemplary radio network node suitably operative in accordance with particular embodiments.

FIG. 14 is a block schematic of an exemplary radio network node 120 suitably operative in accordance with particular embodiments. Radio network node 120 can be, for example, a radio access node, such as an eNodeB, a node B, a base station, a wireless access point (e.g., a Wi-Fi access point), a low power node, a base transceiver station (BTS), a transmission point or node, a remote RF unit (RRU), a core network node, or other network node. Examples of a core network node include, but are not limited to, a mobile switching center (MSC), a serving GPRS support node (SGSN), a mobility management entity (MME), a radio network controller (RNC), and a base station controller (BSC). Such other network nodes can include processors, memory, and interfaces similar to those described with respect to FIG. 14; such other network nodes, however, might not necessarily include a wireless interface, such as transceiver 1410.

Radio network node 120 includes at least one processor 1420, at least one memory 1430, and at least one network interface 1440; in certain embodiments, radio network node 120 can also include a transceiver 1410. Transceiver 1410 facilitates transmitting wireless signals to and receiving wireless signals from wireless device 110 (e.g., via an antenna); processor 1420 executes instructions to provide some or all of the functionality described above as being provided by a radio network node 120; memory 1430 stores the instructions executed by processor 1420; and network interface 1440 communicates signals to backend network components, such as a gateway, switch, router, Internet, Public Switched Telephone Network (PSTN), other radio network nodes 120, and/or core network nodes 130. The processor 1420 and memory 1430 can be of the same types as described supra with respect to FIG. 13.

In some embodiments, network interface 1440 is communicatively coupled to processor 1420 and refers to any suitable device operable to receive input for radio network node 120, send output from radio network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

In certain embodiments, network node 120 may include one or more modules, such as access transfer control module 1450 and voice call continuity module 1460. The one or more modules may provide certain functionalities. For example, access transfer control module 1450 may include access transfer control functionality. In certain embodiments, access transfer control module 1450 may be a local anchoring point in a network. In certain embodiments, access transfer control module 1450 may dynamically assign session transfer numbers to one or more wireless devices. Voice call continuity module 1460 may be operable to store session transfer numbers dynamically assigned to a wireless device. In certain embodiments, voice call continuity module 1460 may be a voice call continuity application server or a session centralization and continuity application server. Although FIG. 14 illustrates both access transfer control module 1450 and voice call continuity module 1460 as part of the same network node 120, the present disclosure contemplates that network node 120 may include none, one, or both of the illustrated modules.

Other embodiments of radio network node 120 include additional components (beyond those shown in FIG. 14) responsible for providing certain aspects of the node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method of providing voice call continuity for a wireless device provisioned with a first session transfer number, wherein the method is performed in a service centralization and continuity application server (SCC-AS) in a home network of the wireless device, the method comprising:

during registration of the wireless device, receiving, from an access transfer control function (ATCF) in a visited network, a registration message including a second session transfer number dynamically assigned to the wireless device by the ATCF for voice call continuity;

storing in memory the second session transfer number dynamically assigned by the ATCF;

receiving, from a mobile switching center, a network query message, the network query message sent in response to the mobile switching center receiving a call origination message from the wireless device when requesting handover to the mobile switching center, the call origination message including the first session transfer number as a destination;

determining that there is an active call involving the wireless device that sent the call origination message; and sending to the mobile switching center a network query response message that includes the second session transfer number dynamically assigned by the ATCF.

2. The method of claim 1, wherein the second session transfer number is associated with the assigning ATCF and causes the mobile switching center to send a call origination message to the assigning ATCF in response to receiving the network query response message.

3. A network node service centralization and continuity application server (SCC-AS) in a home network of a wireless device, the wireless device being provisioned with a first session transfer number, comprising:

a memory; and processing circuitry coupled to the memory and configured to perform the following to provide voice call continuity for the wireless device:

during registration of the wireless device, receive, from an access transfer control function (ATCF) in a visited network a registration message including a second session transfer number dynamically assigned to the wireless device by the ATCF for voice call continuity;

store, in the memory, the second session transfer number dynamically assigned by the ATCF;

receive, from a mobile switching center, a network query message, the network query message sent in response to the mobile switching center receiving a call origination message from the wireless device when requesting handover to the mobile switching center, the call origination message having the first session transfer number as its destination;

determine that there is a call involving the wireless device that sent the call origination message; and send to the mobile switching center a network query response message that includes the second session transfer number dynamically assigned by the ATCF.

4. The SCC-AS of claim 3, wherein the second session transfer number is associated with the assigning ATCF and causes the mobile switching center to send a call origination message to the assigning ATCF in response to receiving the network query response message.

* * * * *